United States Patent
Huang et al.

(10) Patent No.: US 7,623,659 B2
(45) Date of Patent: Nov. 24, 2009

(54) BIOMETRIC NON-REPUDIATION NETWORK SECURITY SYSTEMS AND METHODS

(75) Inventors: Kung-Shiuh Huang, Orange, CA (US); Shu-Chuan Yao, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 829 days.

(21) Appl. No.: 11/266,936

(22) Filed: Nov. 4, 2005

(65) Prior Publication Data

US 2007/0106895 A1    May 10, 2007

(51) Int. Cl.
*H04L 9/00*    (2006.01)
(52) U.S. Cl. ........................................... 380/44
(58) Field of Classification Search .................. 380/44
See application file for complete search history.

(56) References Cited

U.S. PATENT DOCUMENTS

| | | | |
|---|---|---|---|
| 5,680,460 | A | 10/1997 | Tomko et al. |
| 5,832,091 | A | 11/1998 | Tomko et al. |
| 6,002,770 | A | 12/1999 | Tomko et al. |
| 6,320,974 | B1 | 11/2001 | Glaze et al. |
| 6,687,375 | B1 | 2/2004 | Matyas, Jr. et al. |
| 6,850,252 | B1 * | 2/2005 | Hoffberg ............... 715/716 |
| 2004/0129787 | A1 | 7/2004 | Saito et al. |
| 2004/0221163 | A1 * | 11/2004 | Jorgensen et al. .......... 713/182 |
| 2007/0016684 | A1 * | 1/2007 | Stieglitz et al. .............. 709/229 |

OTHER PUBLICATIONS

P. K. Janbandhu et al. "Novel Biometric Digital Signatures for Internet based Applications" Information Management and Computer Security, Emerald, vol. 9, pp. 205-212, 2001.
P. K. Janbandhu, et al. "A new biometric based Signature system," In Proceedings of International Conference on Information, Communications and Signal Processing, 2001.
P. K. Janbandhu, et al. "Modified Private Key Generation for Biometric Signatures," In Proceedings of the WSEAS MIV Malta, Sep. 2001, pp. 2561-2566.
P. Janbandhu, "Modified Private Key Generation for Biometric Signatures," In "Advances in Automation, Multimedia and Video Systems, and Modern Computer Science," 2001.
P. Janbandhu, et al., "Digital Signature Generation using Biometrics," Electrical and Electronic Engineering Research Bulletin, pp. 62-63, 2002.

* cited by examiner

*Primary Examiner*—Kambiz Zand
*Assistant Examiner*—Stephen Sanders
(74) *Attorney, Agent, or Firm*—Haynes and Boone, LLP.

(57) ABSTRACT

In accordance with an embodiment of the present invention, a client device includes a biometric unit, a transceiver unit, and a cryptographic engine. The biometric unit generates a first biometric feature at a first time and a second biometric feature at a second time based on sensing a portion of a human body. The transceiver unit sends and receives message data over a network. The cryptographic engine encrypts and decrypts message data, generates client public and private keys associated with a client device identifier, and generates biometric public and private keys associated with the first user biometric feature. The cryptographic engine encrypts a hash of a first message data using the biometric private key when the first and second biometric features match, and appends the encrypted hash forming an authenticated first message data that is encrypted by a server public key and sent over the network.

24 Claims, 10 Drawing Sheets

BIOMETRIC NON-REPUDIATION NETWORK SECURITY SYSTEMS AND METHODS

TECHNICAL FIELD

This invention relates generally to electronic transactions over a network, and more particularly to security systems and methods for biometrically verifying a transaction author.

BACKGROUND

Currently, the most widely used internet secure protocol does not have a mechanism to address a possible denial of validity, or repudiation, of an act such as an on-line purchase by a user. The term repudiation includes rejecting, disowning, or disclaiming as invalid a particular act or operation purportedly executed by a particular user or person. For example, a user can claim that his credit card was stolen and falsely charged, resulting in significant financial losses each year. Even the popular HyperText Transfer Protocol with Secure Sockets Layer (HTTPS) fails to provide un-falsifiable evidence that a specific action occurred. Therefore, there remains a need in the art for devices and methods that address problems due to the lack of a non-repudiation security mechanism.

BRIEF DESCRIPTION OF THE DRAWINGS

Embodiments of the present invention and their advantages are best understood by referring to the detailed description that follows. It should be appreciated that like reference numerals are used to identify like elements illustrated in the figures.

DETAILED DESCRIPTION

Devices, methods and systems are disclosed herein, in accordance with one or more embodiments of the present invention, that provide a very strong security mechanism by using a unique identification pairing of a client device's serial number and a user's own biometric information. The devices and methods may also be effective in reducing the repudiation incidence for particular acts, such as on-line purchases, under certain conditions.

A client-server system can include a server device in a preferred location and a plurality of client devices that are distributed to users in a traditional client/server arrangement. Depending on the type of service, the client devices can include television set-top boxes such as cable decoders, internet enabled phones, cellular phones, personal computers (PCs), personal digital assistants (PDAs), embedded system devices, and network devices, for example. Each client device has a unique client identifier that is associated with a client device public key cryptosystem key pair. The client device also has a biometric, such as a fingerprint reader, that can produce a biometric feature based on a biometric sample.

Figure 1:
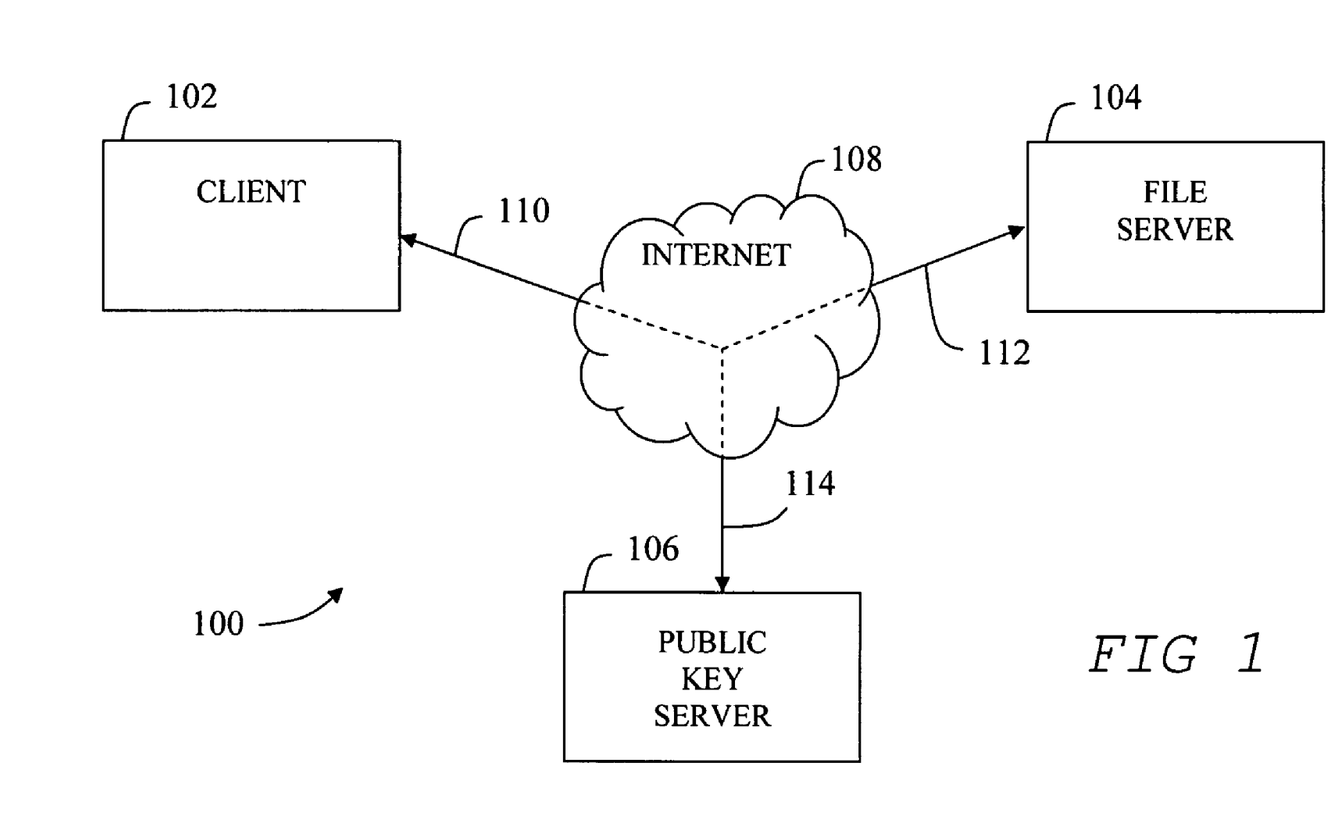
FIG. 1 shows a network with interconnections between a client, a file server and a public key server, in accordance with an embodiment of the present invention.

FIG. 1 shows an exemplary network 100 with interconnections between a client device 102, a file server 104, and a public key server 106. Client 102, file server 104, and public key server 106 can send and receive messages over a traditional interconnection network 108, such as a switched packet network including the Internet, or another network or sub-network conforming the Internet Protocol (IP) and/or the Transfer Control Protocol (TCP). Client 102 is connected to network 108 through a communication channel 110, file server 104 is connected to network 108 through communication channel 112, and public key server 106 is connected to network 108 through a communication channel 114 so that information may be exchanged between the network devices (102, 104, 106) through network 108. Each communication channel (110, 112, and 114) can be a wired or wireless connection for sending and receiving messages between these and other network devices connected to network 108. In this exemplary network 100, client 102 may request a transaction with file server 104 that is facilitated using public keys stored in public key server 106 that functions as a public trusted center or key escrow repository.

Figure 2:
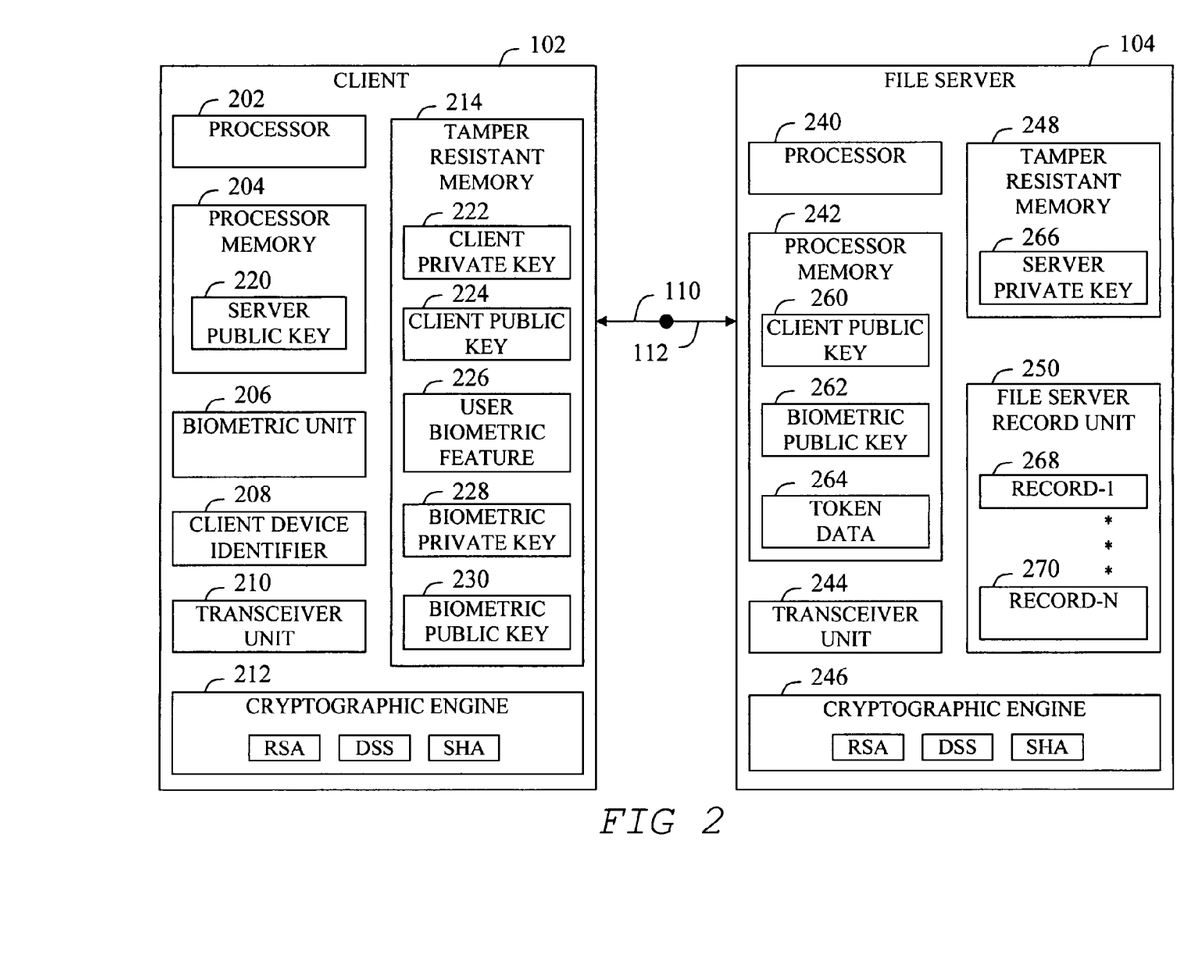
FIG. 2 shows a block diagram view of a client device and a file server, in accordance with an embodiment of the present invention.

FIG. 2 shows a block diagram view of client 102 and file server 104 connected by network interconnections (110, 112). Client 102 includes a processor 202, a processor memory 204, a biometric unit 206, a client device identifier 208, a network transceiver unit 210, a cryptographic engine 212, and a tamper resistant memory 214. Processor 202 can be a suitably programmed microprocessor for use in controlling the operations of client 102 as well as the sending and receiving of messages through transceiver unit 210 over communication channel 110. Processor memory 204 can store and retrieve data including a server public key 220 corresponding to file server 104 and other information for both temporary and long-term storage.

Processor memory 204 can be any conventional memory storage device including a Random Access Memory (RAM), a magnetic or optical disc, or a register file implemented on a computer chip, for example.

Biometric unit 206 includes a biometric sensor (FIGS. 9 and 10) for sensing a portion of a body, such as a digit or an eye, to determine a biometric feature based on the sensed body portion. Client device identifier 208 can be a serial number or other identification that is unique to client 102. Cryptographic engine 212 can execute one or more cryptographic algorithms to encrypt and decrypt message data, generate cryptographic keys, and generate cryptographic signatures based on the defined parameters of one or more cryptographic algorithms. Tamper resistant memory 214 can store and retrieve a client private key 222, a client public key 224, a user biometric feature 226, a user biometric private key 228 and a user biometric public key 230.

Exemplary cryptographic algorithms for execution within cryptographic engine 212 can include a public-key encryption and decryption algorithm such as the ubiquitous RSA (Rivest, Shamir, and Adleman) algorithm by RSA Security of Bedford, Mass. The Internet Engineering Task Force (IETF) Request For Comments (RFC) document number 2313, referred to as IETF-RFC2313, describes the RSA public-key cryptosystem. Another cryptographic algorithm family is the Secure Hash Algorithm (SHA), referred to in another IETF document IEFT-RFC3174, that provides for computing a unique "fingerprint" of a message. A third cryptographic algorithm, the Digital Signature Standard (DSS), utilizes SHA-1 computes a digital signature to uniquely identify a particular user as the author of a particular message. DSS, as described in the U.S. Federal Information Processing Standards Publication 186 referred to as FIPS 186, provides a Digital Signature Algorithm (DSA) standard for generating a digital signature.

Since memory 214 stores sensitive information, it is constructed in a way that it is physically secure and cannot be easily tampered with. That is, memory 214 can, for example, contain sensors in order to detect or reveal when the memory outer casing is violated, packaging the memory device so it is not easily accessible, utilizing built-in circuitry to provide translation of the input or output data or to unlock the memory contents, and/or using an error correction method to yield a proper output, and other techniques. Tamper resistant memory 214 can be considered as an identity memory since the identifying information for the client and one or more particular users can be stored within. A number of users may be associated with a particular client device 102. Hence, tamper resistant memory 214 may include a number of user data sets, each including a user biometric feature 226, a biometric private key 228, and a biometric public key 230. Finally, memory 214 can be removable so that the client identification and user identifying information may be transferred to another client in the event that a failure occurs in client 102 or if maintenance is required for client 102.

One or more client biometric features 226 may be stored in memory 214 corresponding to a number of users associated with client 102. Client private key 222 and client public key 224 comprise a public-key cryptographic system key pair associated with client 102 and stored with or identified with client device identifier 208 so that a public user may encrypt a message to the client device by using the associated public key. The public key of a key pair is generally widely available and may be used by a second network device to encrypt a message with a public key so that only the party in possession of the associated private key may successfully decrypt and read the message. Similarly, biometric private key 228 and biometric public key 230 comprise another key pair for use with a public key cryptographic algorithm where the biometric key pair is associated with a particular user. This association with a particular user can include association such as with any one of a particular user account, an e-mail account, or another user identifier. Alternatively, a public key may be used to encrypt or encipher a message so that the corresponding private key is needed to decrypt or decipher the message. The client identifier can be associated with a client public key and/or the client public key may be used as a client identifier. It may be preferable in some applications to associate a predetermined client identifier with a subsequently generated client public key in order to conform to a client identifier pattern such as a sequential order.

File server 104 can be a network device that can respond to transaction requests such a request to create a new record of information, view an existing record, change an existing record, or delete a record. Changing records in this manner may be associated with an on-line purchase using a credit card, provisioning service from an online service provider, or other transaction related to Internet-based commerce.

While a regular username and user password may be sufficient for non-critical access, due to security concerns, only authorized users may execute transactions for particular records. For a network device with access to the Internet 108, as shown in FIG. 1, physical security is not usually sufficient to safeguard access to a network device. Hence, there is a need to authenticate a user prior to granting a requested transaction. File server 104 includes a processor 240, a processor memory 242, a network transceiver unit 244, a cryptographic engine 246, a tamper resistant memory 248, and a file server record unit 250. Processor 240 can be a suitably programmed microprocessor for use in controlling the operations of file server 104 as well as the sending and receiving of messages through transceiver unit 244 over communication channel 112. Processor memory 242 can store and retrieve data including a client public key 260, a biometric public key 262 for a user at client 102, and a validation token data 264, along with other information for both temporary and long-term storage. Processor memory 242 can be any conventional memory storage device including a Random Access Memory (RAM), a magnetic or optical disc, or a register file implemented on a computer chip, for example.

Cryptographic engine 246 can execute one or more cryptographic algorithms to encrypt or decrypt message data, generate cryptographic keys, and generate cryptographic signatures corresponding to algorithms executed by cryptographic engine 212, as previously discussed. Tamper resistant memory 248 can store and retrieve a server private key 266. Finally, file server record unit 250 can include a number of data records, shown as Record-1 268 through Record-N 270. In an exemplary operation, a user associated with client 102 may request a transaction using record-1 268, where file server 104 can authenticate both the identity of the requesting user as well as the purported client device 102 through which the request was made. In this manner, both the identity of a user and the expected location of the user's access can be verified prior to granting access to a requested record.

Figure 3:
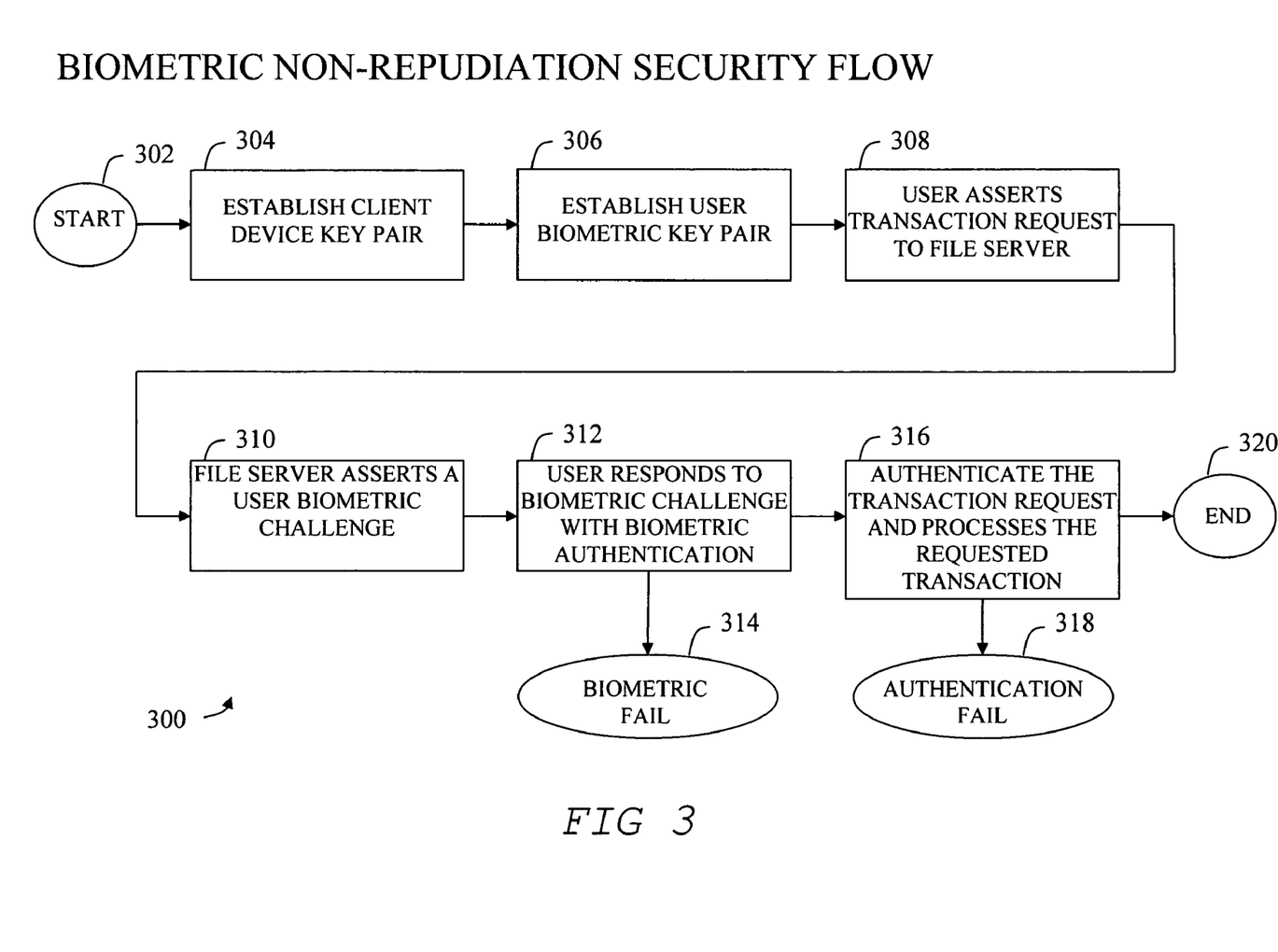
FIG. 3 shows a block diagram view of a biometric non-repudiation security flow, in accordance with an embodiment of the present invention.

FIG. 3 shows a block diagram view of a biometric non-repudiation security flow 300 to authenticate a user's identity and location in order to avoid a later disavowal of the user-initiated transaction. Beginning at start 302, flow 300 begins with establishing 304 a client device public and private key pair for client 102, as described in reference to FIG. 1. Once the client device key pair is established, flow 300 continues with establishing 306 a user biometric key pair to define a public and private key pair associated with a particular user at client 102 including the generation of a golden biometric sample of a user. Once both the client key pair and the user biometric key pairs are established, flow 300 continues with the user asserting 308 a transaction request to file server 104, as described in reference to FIG. 1.

Flow 300 continues with the file server responding to the transaction request by asserting 310 a user biometric challenge followed by the user responding 312 to the biometric challenge with a biometric authentication including a new biometric sample. The new biometric sample is compared with the golden biometric sample collected previously and will either match or fail to match in operation 312. If the biometric fails to match, flow 300 will terminate with the biometric failing 314. However, if the biometric matches, flow 300 will continue with authenticating 316 the transaction request and processing the requested transaction. The authentication of the transaction request in operation 316 will either pass or fail. If the authentication fails, flow 300 will terminate with the authentication failing 318. However, if the authentication passes, the requested transaction is processed and flow 300 terminates successfully at end 320.

Figure 4:
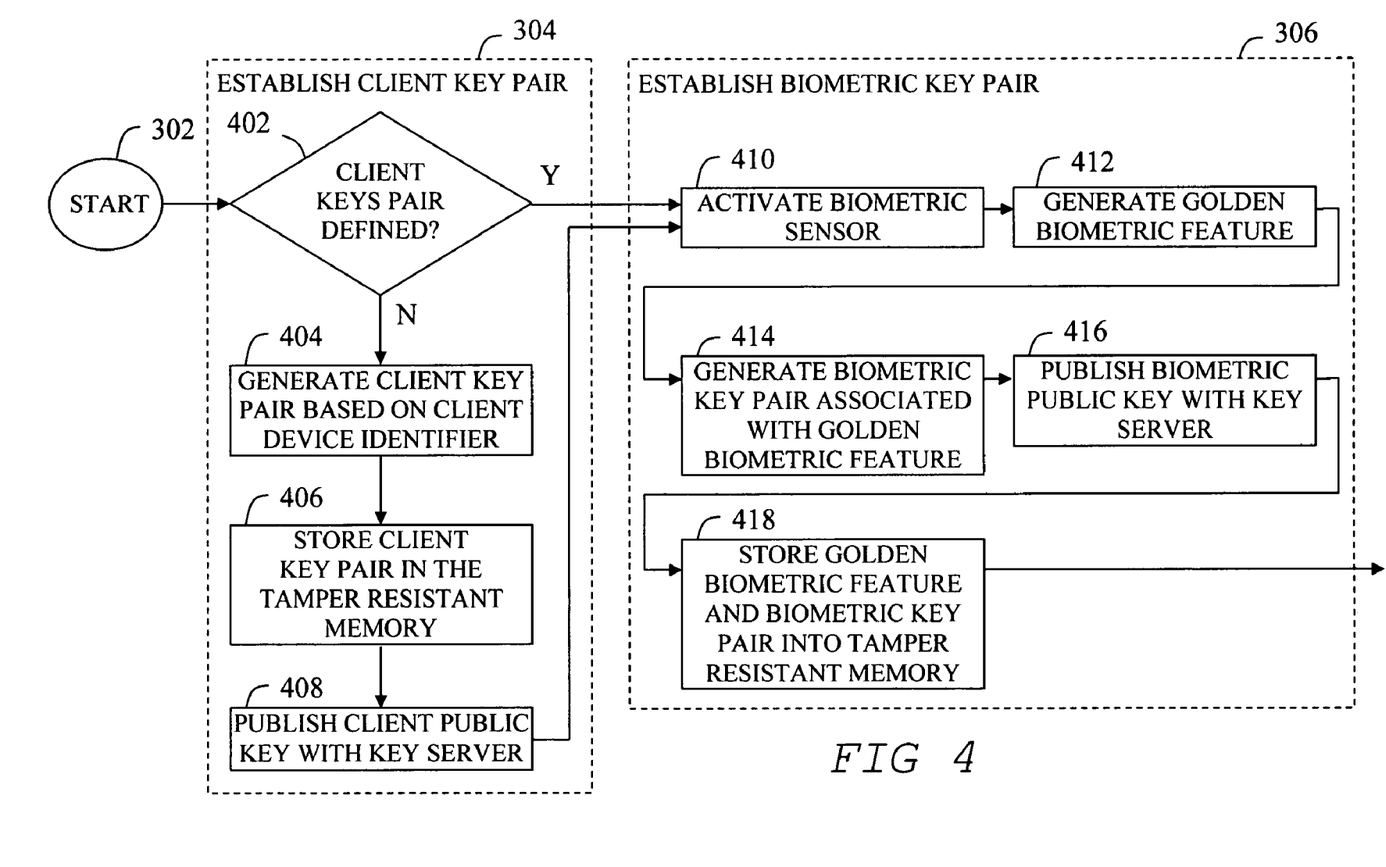
FIG. 4 shows a block diagram view of a flow to establish a client key pair and a biometric key pair, in accordance with an embodiment of the present invention.

FIG. 4 shows a block diagram view of a flow comprising operation 304 for establishing a client key pair and a flow comprising operation 306 for establishing a biometric key pair in flow 300, as discussed in reference to FIG. 3. Operation 304 includes a first decision 402 to determine whether the client key pair is already defined. If a client key pair is not already defined, the decision of 402 is "N" and operation 304 then includes the operations of generating 404 a client key pair associated with the client device identifier, storing 406 the client key pair in the tamper resistant memory, and publishing 408 the client public key with key server 106, as shown in FIG. 1. Conversely, if the client key pair is already defined, the decision of 402 is "Y" and the key pair may have been loaded onto a new client 102 with the public key already published in the corresponding key server, for example. In this case, flow 300 continues directly to establishing 306 the biometric key pair in operation 306. Alternatively, a client key pair may be defined, stored in the tamper resistant memory, yet not published in the corresponding key server. In this case, the flow comprising operation 304 is abbreviated to only include publishing the client public key with the corresponding key server. The process of publishing a public key includes sending one or more messages to the corresponding key server enclosing the public key and an identifier for client 102 that may include the client identifier 208, as discussed in reference to FIG. 2.

A flow comprising operation 306 for establishing a biometric key pair includes activating 410 a biometric sensor (FIGS. 9 and 10) associated with biometric unit 206, as mentioned in reference to FIG. 2. The biometric sensor generates 412 a golden biometric feature determined by scanning a portion of a user's body, such as the fingerprint or an iris, in order to extract information useful in uniquely identifying the scanned portion of the user's body. The flow of operation 306 continues with generating 414 a biometric key pair associated with the golden biometric feature. There is a unique, one-to-one association between the biometric feature and the biometric private key. Neither the biometric feature nor the biometric private key is to be published during the registration of an authorized user with the client device. No one can change the biometric private key or the biometric feature of the authorized user once the registration of that authorized user is complete. After the user biometric key pair is generated, the flow of operation 306 continues with publishing 416 the biometric public key with the key server 106. Once both the golden biometric feature and biometric key pair are generated, operation 306 ends with storing 416 the user biometric feature 226, biometric private key 228, and biometric public key 230 into tamper resistant memory 214, as discussed in reference to FIG. 2.

Figure 5:
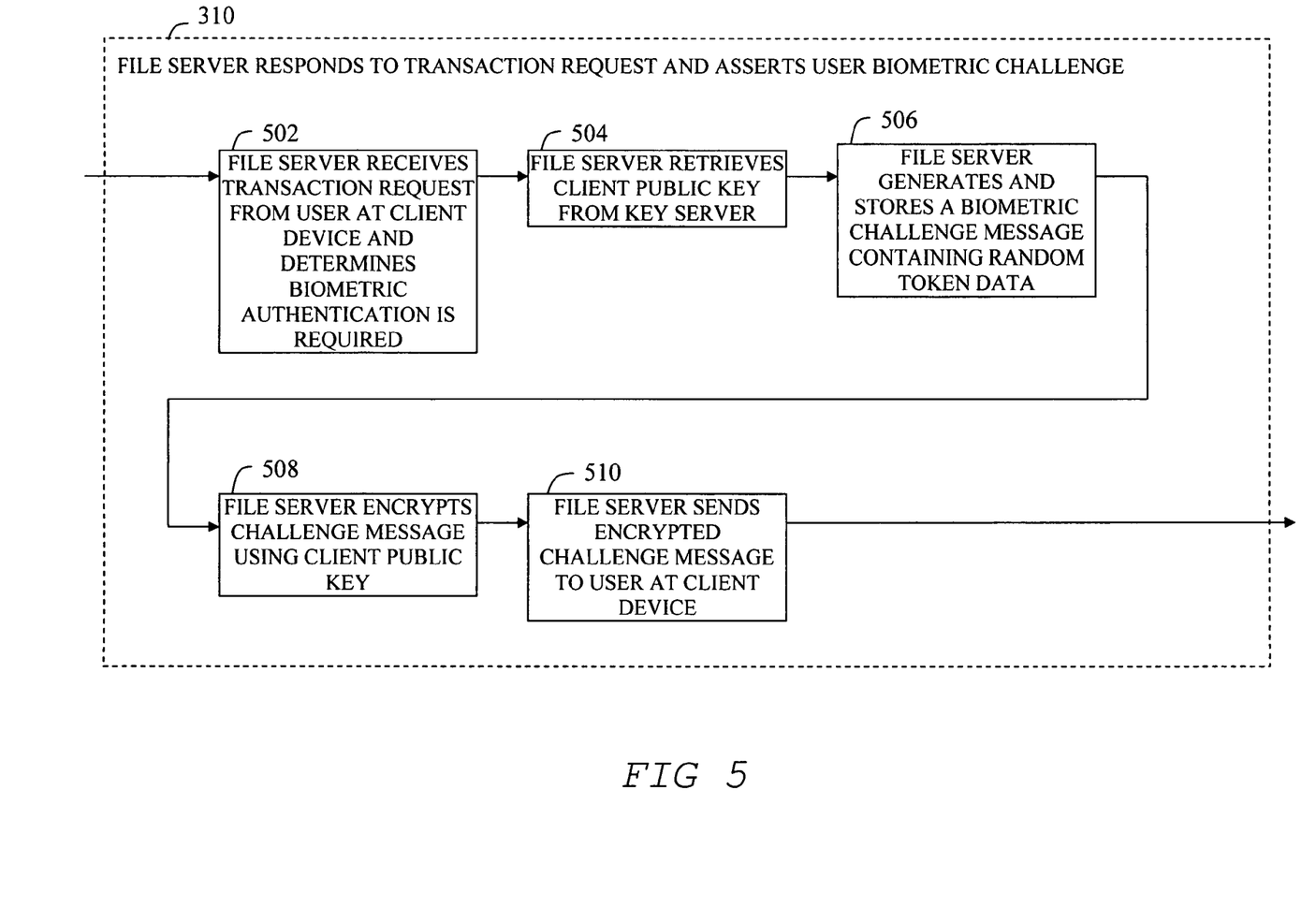
FIG. 5 shows a block diagram view of a flow wherein a file server responds to a transaction request and asserts a user biometric challenge, in accordance with an embodiment of the present invention.

FIG. 5 shows a block diagram view of a flow comprising operation 310 for responding to the transaction request by asserting a user biometric challenge in flow 300, as discussed in reference to FIG. 3. Operation 310 includes the file server receiving the transaction request from a user at client device 102 and determining 502 a biometric authentication is required. This determination can be made based on several factors, including the nature of the requested transaction itself, a limitation of classification of the requested transaction or data, and the location of client 102 or the identity of the user/requestor. Operation 310 continues with the file server retrieving 504 the associated client public key from key server 106. After retrieving the client public key, operation 310 continues with the file server generating 506 and storing a biometric challenge message containing random token data. This random token data is used later to validate a received message since only the file server originally possesses the random token data. Operation 310 continues with the file server encrypting 508 the challenge message using the retrieved client public key, and the file server sending 510 the encrypted challenge message to the requesting user at client 102. File server may send the message of operation 510 to the authenticated address of client 102, rather than a purported address in a particular recent transaction in order to guard against falsification of this message.

Figure 6:
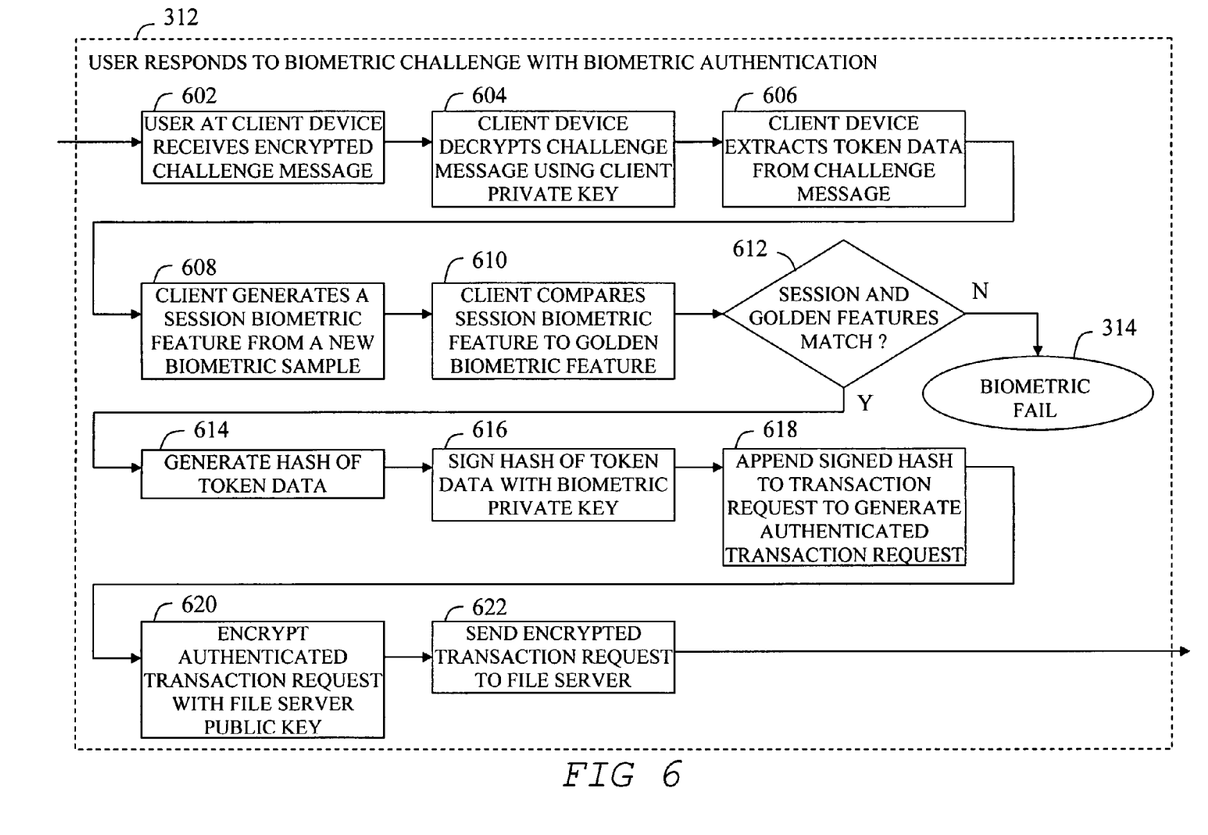
FIG. 6 shows a block diagram of a flow wherein a user responds to a biometric challenge with a biometric authentication, in accordance with an embodiment of the present invention.

FIG. 6 shows a block diagram of a flow comprising operation 312, wherein a user responds to a biometric challenge with a biometric authentication in flow 300, as discussed in reference to FIG. 3. A flow comprising operation 312 includes the user at the client device receiving 602 the encrypted challenge message, and decrypting 604 the challenge message using the client private key 222. This ensures the user is actually connected with client 102, since only client 102 is in possession of client private key 222. Once the challenge message is decrypted, operation 312 continues with the client device extracting 606 the token data from the challenge message. Once the token data is extracted, flow 312 continues with the user at client 102 generating 608 a session biometric sample from which is extracted a session biometric feature in a manner similar to the user biometric feature 226. The user will be prompted to provide the biometric sample by interacting with the biometric sensor.

Operation 312 continues with comparing 610 the session biometric feature with the golden biometric feature 226. When the session and golden biometric features do not match, the decision 612 is "N" and the biometric fails 314. However, when the session and golden biometric features match, the decision 612 is "Y" and the operation 312 continues with generating 614 a hash of the extracted token data. A hash is generated to reduce overall message size. The hashing algorithm must be known and agreed upon by both client 102 and file server 104. Once the hash is generated, operation 312 continues with signing 616 a hash of the token data with biometric private key 228, and appending 618 the signed hash to the transaction request to generate an authenticated transaction request. Operation 312 continues with encrypting 620 the authenticated transaction request with the file server public key 220, and sending 622 the encrypted transaction request to file server 104. In this manner, the authenticate transaction request includes a message that is encrypted with the file server public key so that only the file server may decrypt the message. This ensures that the requested transaction is secured, and will not be meaningful to any device not in possession of the corresponding server private key 266.

Figure 7:
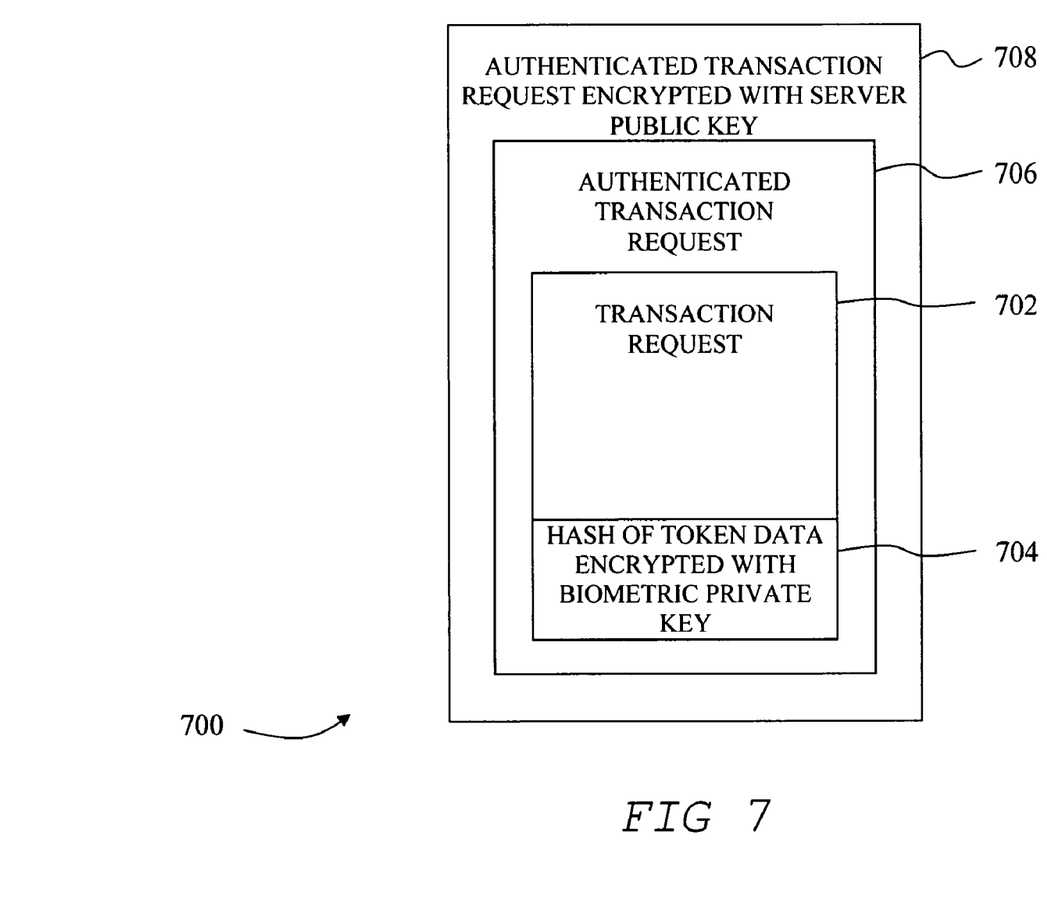
FIG. 7 shows an exemplary embodiment of an encrypted, authenticated transaction request, in accordance with an embodiment of the present invention.

FIG. 7 shows an exemplary embodiment of an encrypted transaction request 700 as described in operation 312, as shown in FIG. 6. Request 700 employs a layered encryption protocol to ensure that only an authenticated transaction request may be successfully received and processed. A transaction request 702 and a token data hash 704 encrypted with the user biometric private key together comprise an authenticated transaction request 706 that is then encrypted by the server public key.

Figure 8:
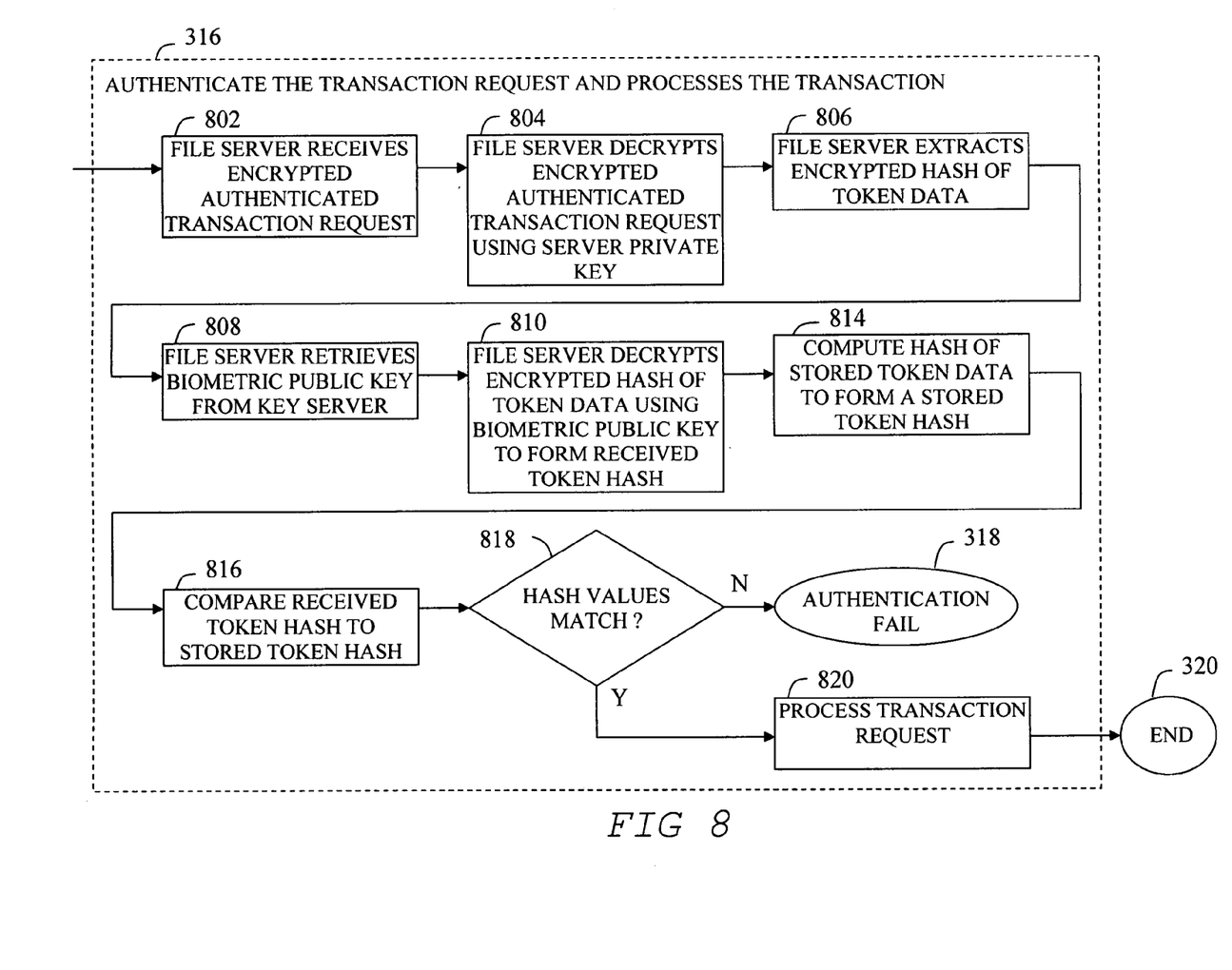
FIG. 8 shows a block diagram of a flow wherein the file server authenticates the transaction request and processes the transaction, in accordance with an embodiment of the present invention.

FIG. 8 shows a block diagram of a flow comprising operation 316, wherein the file server authenticates the transaction request and processes the transaction in flow 300, as discussed in reference to FIG. 3. A flow comprising operation 316 includes the file server receiving 802 the encrypted authenticated transaction request, decrypting 804 the encrypted authenticated transaction request using server private key 266, and extracting 806 and encrypted hash of the token data. Operation 316 continues with file server 104 retrieving 808 biometric public key 230 from key server 106, and decrypting 810 the encrypted hash of the token data using biometric public key 230 to form a received token hash. Operation 316 continues with computing 814 a hash of the stored token data in file server 104, and comparing 816 the decrypted hash to the extracted hash in operation 810. If the hash values do not match, the decision 818 is "N" and authentication fails 318. However, if the hash values match, then the decision 818 is "Y" and operation 316 continues with processing 820 the transaction request, and flow 300 successfully terminates at end 320.

In this manner, an authenticated user has executed a transaction in a client/server environment which is non-repudiatable since they cannot later disavow either transaction or their identify as the transaction author. Since the session biometric is compared in real-time to the golden biometric at the time of the transaction, the key server has provided the appropriate public keys, and the file server communicates with the client based on the client identifier, the presence of the user at the client 102 is verified along with the biometric signature. The authorship of the transaction by the user cannot be disputed.

Figure 9:
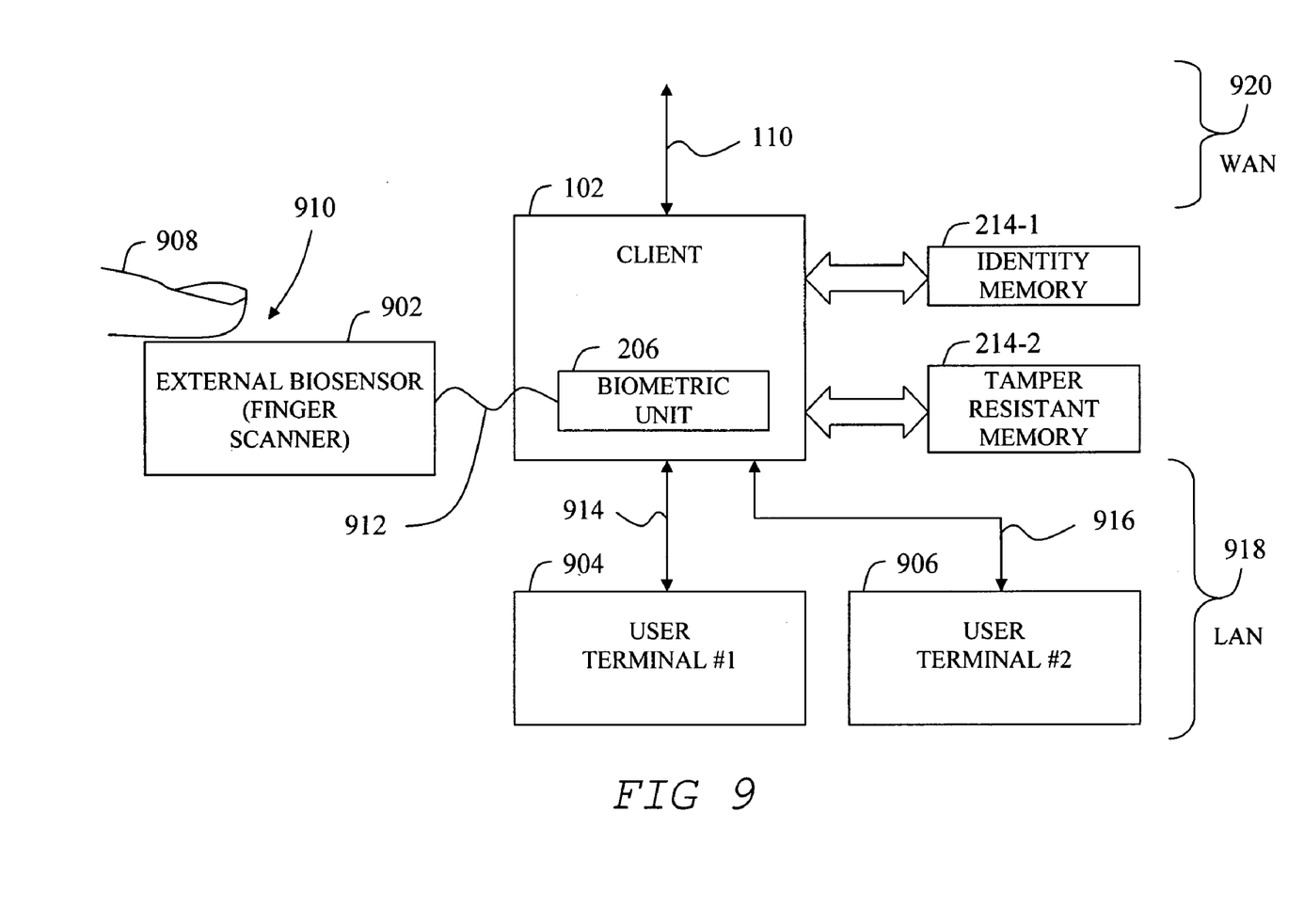
FIG. 9 shows a block diagram view of a client device interfacing with an external biosensor and two user terminals, in accordance with an embodiment of the present invention.

FIG. 9 shows a block diagram view of a client device 102 interfacing with an external biosensor 902 (finger scanner) and two user terminals (904, 906) where external biosensor 902 is external to the body of client 102. External biosensor 902 is configured to determine a biometric feature, such as the distinguishing components of a finger print image, from a user's finger 908 placed on a finger-reading portion 910 of external biosensor 902 where the biometric feature is communicated to biometric unit 206 through a communications channel 912 and communicated to client 102 and then stored in a memory. User terminal #1 904 is connected to client 102 through a communications channel 914, while user terminal #2 906 is connected to client 102 through a communications channel 916. Each of the communication channels (912, 914, and 916) can be a wireless radio connection, a wireless optical connection, or a wired connection such as a network cable. In this embodiment, client device 102 can be a router or other customer premises equipment (CPE) for connecting one or more user terminals on a local area network (LAN) 918 at a first level of network hierarchy to a wide area network (WAN) 920 at a second level of network hierarchy. User terminals (904, 906) can be any network device including a personal computer (PC), a network enabled telephone, a personal digital assistant (PDA), a set-top cable decoder box, or game console, for example. External biosensor 902 may be moved to a position near either user terminal #1 or #2 (904, 906) so that a user operating either of these terminals may exercise the biometric non-repudiation security flow 300, as described in reference to FIG. 3. External biosensor 902 may be incorporated into a hand-held sensing device or into the outer covering of another device such as a smart card, or dongle.

Figure 10:
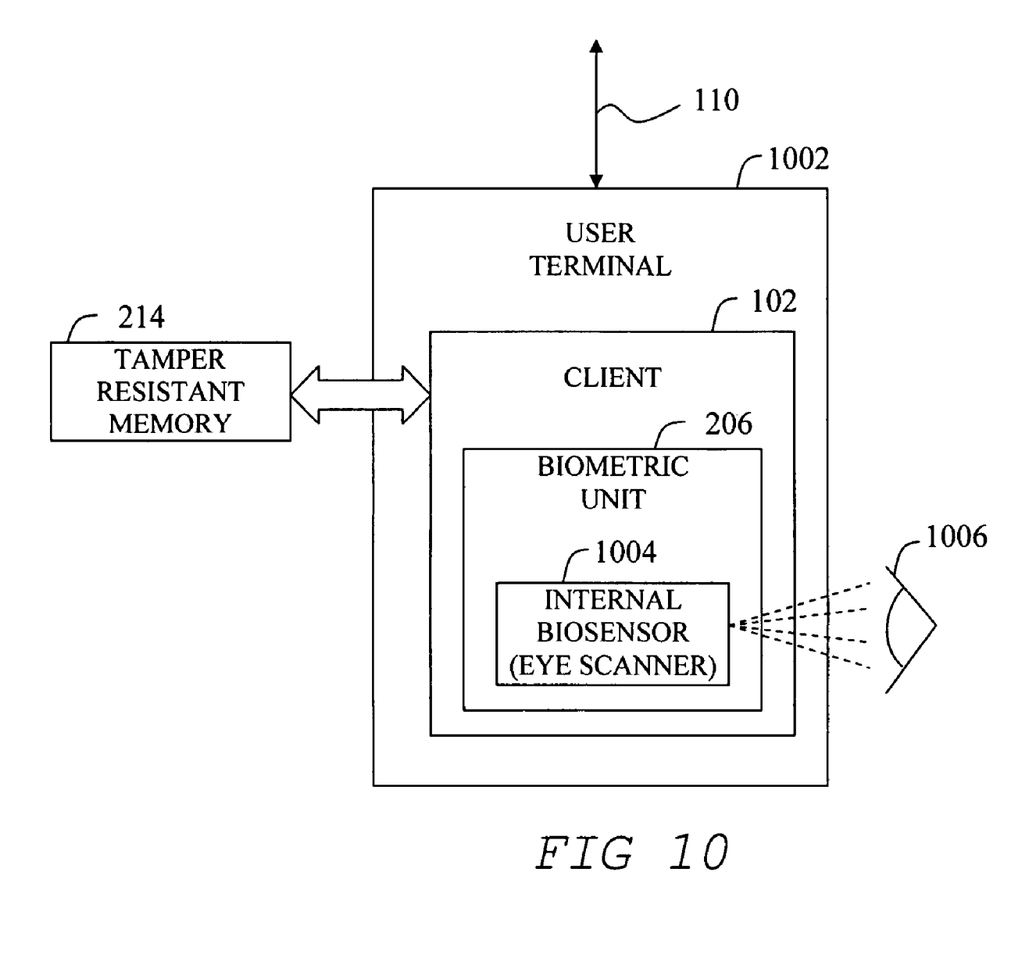
FIG. 10 shows a block diagram view of a client device disposed within a user terminal that includes a biometric unit with an internal biosensor, in accordance with an embodiment of the present invention.

FIG. 10 shows a block diagram view of a client device 102 disposed within a user terminal 1002 that includes a biometric unit 206 with an internal biosensor 1004 (eye scanner), where biosensor 1004 is internal to the body of client 102. Internal biosensor 1004 is configured to determine a biometric feature, such as an iris or retina print, from a user's eye 1006 where the biometric feature is communicated to client 102 and stored in a memory. In this embodiment, user terminal 1002 can be a computer connected to a network 110 or other similar network, while client 102 includes a built-in biosensor 1004 which can be mounted on a monitor device or stalk (not shown) for conveniently scanning a user's eye. In this manner, user terminal 1002 can be considered a biometric authentication terminal where one or more users may exercise the biometric non-repudiation security flow 300, as described in reference to FIG. 3.

Although the invention has been described with respect to particular embodiments, this description is only an example of the invention's application and should not be taken as a limitation. Consequently, the scope of the invention is set forth in the following claims.

We claim:

1. A client device, comprising:
a biometric unit configured to generate a biometric feature based on sensing a portion of a human body, a first biometric feature being generated at a first time for establishing a biometric key pair, a second biometric feature being generated at a second time that is after the first time for authenticating the client device;
a transceiver unit configured to send and receive message data over a network; and
a cryptographic engine configured to one of encrypt and decrypt message data and to generate one or more cryptographic keys based on a predetermined key generating algorithm, the cryptographic engine being configured to generate a client public key and a client private key associated with a client device identifier, the cryptographic engine being configured to generate a biometric public key and a biometric private key associated with the first user biometric feature, the cryptographic engine encrypting a hash of a first message data using the biometric private key when the first biometric feature matches the second biometric feature, wherein the first message data is encrypted with the client public key and contains a random token data from a server, the encrypted hash being appended to the first message data to form an authenticated first message data, the authenticated first message data being encrypted by a server public key to form an encrypted authenticated first message data, the encrypted authenticated first message data being sent over the network.

2. The client device of claim 1, further comprising:
a memory configured to store and retrieve memory data including the client private key, the client public key, the first biometric feature, the biometric private key, the biometric public key, and the server public key, the memory being a tamper proof write-once flash memory.

3. The client device of claim 1, the biometric unit further comprising a biosensor configured to a generate the biometric feature based on sensing one of a user finger print, an iris print, and a retina print.

4. The client device of claim 3, wherein the biosensor is one of external to the client device body, and internal to the client device body.

5. The client device of claim 1, the cryptographic engine being configured to one of encrypt and decrypt message information using at least one of an RSA algorithm, a DSS algorithm, and a SHA algorithm.

6. A user authentication device, comprising:
a component for generating a biometric feature based on sensing a portion of the body of a user, a first biometric feature being generated at a first time for establishing a biometric key pair, a second biometric feature being generated at a second time that is after the first time for authenticating;
a component for sending and receiving message data over a network; and
a component for encrypting and decrypting message data,
the component for encrypting and decrypting message data being configured to generate one or more cryptographic keys based on a predetermined key generating algorithm,
the component for encrypting and decrypting being configured to generate a client public key and a client private key associated with a client device identifier,
the component for encrypting and decrypting being configured to generate a biometric public key and a biometric private key associated with the first user biometric feature,
the component for encrypting and decrypting encrypting a hash of a first message data using the biometric private key when the first biometric feature matches the second biometric feature, wherein the first message data is encrypted with the client public key and contains a random token data from a server, the encrypted hash being appended to the first message data to form an authenticated first message data, the authenticated first message data being encrypted by a server public key to form an encrypted authenticated first message data, the encrypted authenticated first message data being sent over the network by the component for sending and receiving message data.

7. The user authentication device of claim 6, further comprising:
a component for tamper resistantly storing and retrieving data including the client
private key, the client public key, the first biometric feature, the biometric private key, and the biometric public key.

8. A biometric authentication method for a client device, comprising the operations of:
establishing a client device key pair, the client device key pair having a client private key and a client public key;
establishing a user biometric key pair, the biometric key pair having a biometric private key and a biometric public key;
asserting, by the client device, a transaction request;
responding, by the client device, to a received biometric challenge from a second device that includes a predetermined portion encrypted with the client public key, wherein the predetermined portion includes a random token data from a server;
generating, by the client device, a second user biometric feature in response to the received biometric challenge;
generating, by the client device, a server public key encrypted biometric authentication when the second user biometric feature matches the first user biometric feature, the server public key encrypted biometric authentication including a hash of the random token data encrypted with the biometric private key and the transaction request; and
establishing an authenticated communication with the second device.

9. The method of claim 8, wherein the operation of establishing a client device key pair further comprises:
generating a client key pair associated with a client device identifier;
storing the client key pair in a memory; and
publishing the client public key to a key server.

10. The method of claim 9, wherein the client key pair is generated based on a public key encryption algorithm.

11. The method of claim 10, wherein the public key pair is generated based on the RSA algorithm.

12. The method of claim 8, wherein the operation of responding to a received biometric challenge further comprises decrypting a challenge message using the client private key.

13. The method of claim 8, wherein the operation of establishing a user biometric key pair further comprises:
generating a first user biometric feature;
storing the first user biometric feature in a tamper resistant memory;
generating a biometric key pair associated with a first user biometric feature,
the biometric key pair including a biometric public key and a biometric private key;
storing the biometric key pair in the tamper resistant memory; and
publishing the biometric public key to a key server.

14. The method of claim 13, wherein the client key pair is generated based on a public key encryption algorithm.

15. The method of claim 14, wherein the public key encryption algorithm is the RSA algorithm.

16. The method of claim 13, wherein the operations of generating a first user biometric and generating a second user biometric both include one of reading a fingerprint, scanning an iris, and scanning a retina.

17. The method of claim 13, wherein the tamper resistant memory is a write-once flash memory.

18. The method of claim 13, wherein the tamper resistant memory is removable from the client device.

19. The method of claim 13, wherein the hash is generated based on an algorithm in the secure hash algorithm (SHA) family.

20. A file server device, comprising:
a removable tamper proof memory configured to store and retrieve a server private key;
a memory configured to store and retrieve a client public key, a biometric public key, and a token data;
a cryptographic engine configured to one of encrypt and decrypt message data and to generate one or more cryptographic keys based on a predetermined key generating algorithm, the cryptographic engine being configured to generate a server public key and the server private key; and
a transceiver unit configured to send and receive message data over a network, the transceiver unit being configured to receive a transaction request message from a client device and send a biometric challenge message to the client device, a portion of the biometric challenge message including the token data encrypted with the client public key, the transceiver unit being configured to receive a biometric authentication from the client device, a portion of the biometric authentication including a hash of the token data encrypted with the biometric private key and the transaction request message, both encrypted with the server public key, the file server decrypting the biometric authentication using the server private key, extracting the hash of the token data, decrypting the hash of the token data using the biometric public key to form a received token hash, computing a hash of the token data to form a stored token hash, and processing the transaction request when the stored token hash matches the received token hash.

21. The file server device of claim 20, further comprising:
a file server record unit configured to store and modify at least one file server record, a transaction request for a file server record being authenticated when the server public key encrypted token data matches the client public key encrypted token data, the file server transaction request including at least one of creating a new record of information, viewing an existing record, changing an existing record, and deleting a record.

22. A biometric authentication method for a server device, comprising the operations of:
receiving a transaction request from a client device including a predetermined portion encrypted with a server public key, the client device having a client private key and a client public key;
asserting, by the server device, a biometric challenge to the transaction request, the biometric challenge including a random token data encrypted with the client public key, a successful response from the client device to the biometric challenge requiring a match between a golden biometric sample captured during an initialization sequence and a new biometric sample captured after the assertion of the biometric challenge;
authenticating, by the server device, the transaction request when the biometric response from the client device is successful, wherein the authenticating comprises comparing a hash of the random token data received from the client device with a hash of the random token data stored in the server device, wherein the server device receives a server public key encrypted transaction request comprising a biometric private key encrypted hash; and
establishing an authenticated communication with the client device.

23. The method of claim 22, wherein the operation of authenticating the transaction request further comprises:
decrypting the encrypted transaction request portion using the server private key, the encrypted transaction request portion including an encrypted hash of random token data;
decrypting the encrypted hash of the token data using the biometric public key to form a first hashed token data;
computing a hash of a stored token data to from a second hashed token data;
comparing the first hashed token data to the second hashed token data; and
asserting the transaction request is authenticated if the first hashed token data and the second hashed token data match.

24. The client device of claim 1, further comprising a processor memory configured to store and retrieve the server public key, and a second tamper proof write-once flash memory configured to store and retrieve the client private key, the client public key, the first biometric feature, the biometric private key, and the biometric public key.

* * * * *

UNITED STATES PATENT AND TRADEMARK OFFICE
CERTIFICATE OF CORRECTION

PATENT NO.         : 7,623,659 B2                              Page 1 of 1
APPLICATION NO. : 11/266936
DATED              : November 24, 2009
INVENTOR(S)        : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this

Fourteenth Day of December, 2010

David J. Kappos
*Director of the United States Patent and Trademark Office*